(12) United States Patent
Williams et al.

(10) Patent No.: US 11,746,619 B2
(45) Date of Patent: Sep. 5, 2023

(54) TRAVELING RELIEF VALVE

(71) Applicant: Epic Lift Systems, Houston, TX (US)

(72) Inventors: Jason Williams, Weatherford, TX (US); Daniel Brewer, Fort Worth, TX (US); Patrick R. McCarthy, Springtown, TX (US)

(73) Assignee: Epic Lift Systems, Houston, TX (US)

( * ) Notice: Subject to any disclaimer, the term of this patent is extended or adjusted under 35 U.S.C. 154(b) by 0 days.

(21) Appl. No.: 17/494,200

(22) Filed: Oct. 5, 2021

(65) Prior Publication Data
US 2022/0106857 A1    Apr. 7, 2022

Related U.S. Application Data

(60) Provisional application No. 63/088,682, filed on Oct. 7, 2020.

(51) Int. Cl.
*E21B 34/08* (2006.01)
*F16K 17/04* (2006.01)
*F16K 15/02* (2006.01)

(52) U.S. Cl.
CPC ............ *E21B 34/08* (2013.01); *F16K 15/026* (2013.01); *F16K 17/0433* (2013.01); *F16K 17/0466* (2013.01)

(58) Field of Classification Search
CPC ... F16K 15/026; E21B 34/08; Y10T 137/7775
See application file for complete search history.

(56) References Cited

U.S. PATENT DOCUMENTS

| | | | | |
|---|---|---|---|---|
| 695,378 | A * | 3/1902 | Cowles | F16K 15/026 74/18.2 |
| 866,832 | A * | 9/1907 | Whitaker | A47K 5/1204 417/570 |
| 1,865,460 | A * | 7/1932 | Elsey | F16F 9/22 267/223 |
| 2,124,407 | A * | 7/1938 | Stroup | B60T 15/02 303/69 |
| RE22,180 | E * | 9/1942 | Otis | E21B 34/08 137/512.2 |
| 3,861,414 | A * | 1/1975 | Peterson, II | E21B 34/08 137/493.9 |
| 4,470,428 | A * | 9/1984 | Bishop | F04B 49/02 137/115.15 |
| 6,289,990 | B1 * | 9/2001 | Dillon | F16K 17/19 166/373 |
| 2016/0195317 | A1 * | 7/2016 | Dam | F25B 41/38 137/493.8 |

* cited by examiner

*Primary Examiner* — Reinaldo Sanchez-Medina
*Assistant Examiner* — Nicole Gardner
(74) *Attorney, Agent, or Firm* — Park, Vaughan, Fleming & Dowler LLP

(57) ABSTRACT

A traveling relief valve for down-hole use in a well. In one embodiment, the traveling relief valve comprises a seat, a screw, a seal, a carrier, a spring, and a ported tube, where the traveling relief valve is configured to include a first flow interface between the seat and the carrier for flow when the well is producing, and a second flow interface between the seal and the carrier for back-flow in the well.

14 Claims, 11 Drawing Sheets

TRAVELING RELIEF VALVE

CROSS-REFERENCE TO RELATED APPLICATION

This application claims the benefit of U.S. Provisional Patent Application Ser. No. 63/088,682, entitled "Relief Valve," by inventors Jason Williams, Daniel Brewer and Patrick R. McCarthy, filed on 7 Oct. 2020, the contents of which are incorporated by reference herein.

BACKGROUND

Technical Field

Embodiments of the subject matter disclosed herein relate to an improved relief valve and assembly, and methods of operating and using the same.

Discussion of the Background

It is well known that production from oil and gas wells can suffer due to the build-up of fluids at the bottom of the well. Various methods and devices have been developed to remove those fluids so as to improve the well's productivity. The present invention assists in that process.

BRIEF DESCRIPTION OF THE DRAWINGS

The accompanying drawings, which are incorporated herein and constitute a part of the specification, illustrate one or more exemplary embodiments of the present invention. In the drawings.

DETAILED DESCRIPTION

The description of exemplary embodiments refers to the accompanying drawings. The same reference numbers or components in different drawings identify the same or similar elements in other drawings. The details described herein do not limit the invention. Instead, the scope of the invention is defined by the appended claims as understood by a person of ordinary skill in the art in light of this description and the accompanying Figures.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" (or variants thereof) in various places throughout the specification is not necessarily referring to the same embodiment. Further, the particular features, structures, or characteristics may be combined in any suitable manner in one or more embodiment. The invention, however, is not limited to any one embodiment.

Figure 1:
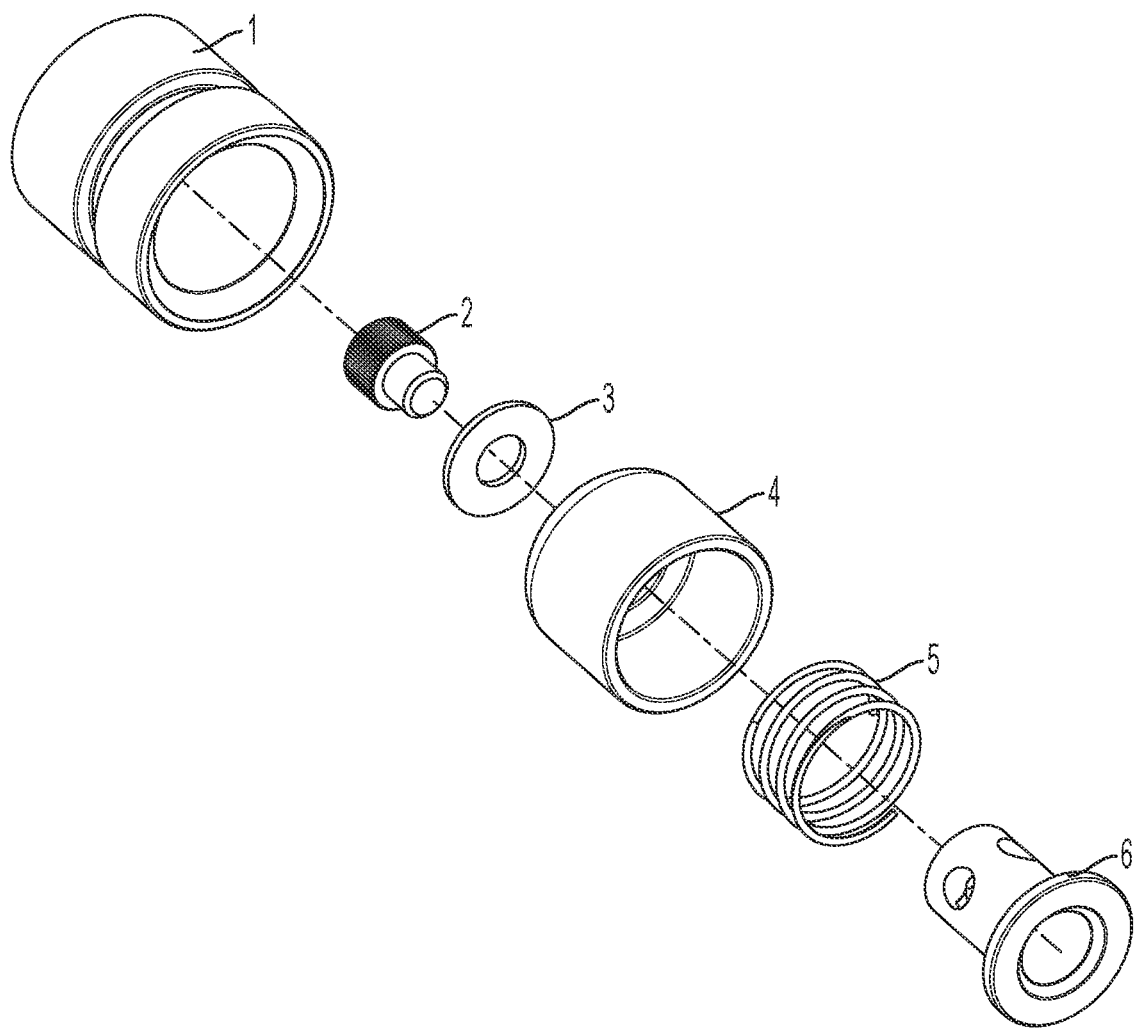
FIG. 1 is an assembly diagram of one embodiment of a relief valve of the present invention.

FIG. 1 is an assembly diagram of an exemplary embodiment of a relief valve of the present invention. Specifically, FIG. 1 shows seat 1, which is sized to interface with an assembly comprising screw 2, seal 3, carrier 4, spring 5, and ported tube 6, where ported tube 6 includes one or more ports through which well fluids can pass. Those skilled in the art will recognize that additional components could be used and, likewise, that certain of the depicted individual components could be combined. The assembly shown in FIG. 1 can be assembled by well-recognized means. For example, while screw 2 is shown without threads, it should be understood that it could include threads so as to attach to a threaded interior of ported tube 6. Likewise, mating components can be chamfered so as to provide better fit and seal between the surfaces, such as between the mating surfaces of seat 1 and carrier 4.

Figure 2:
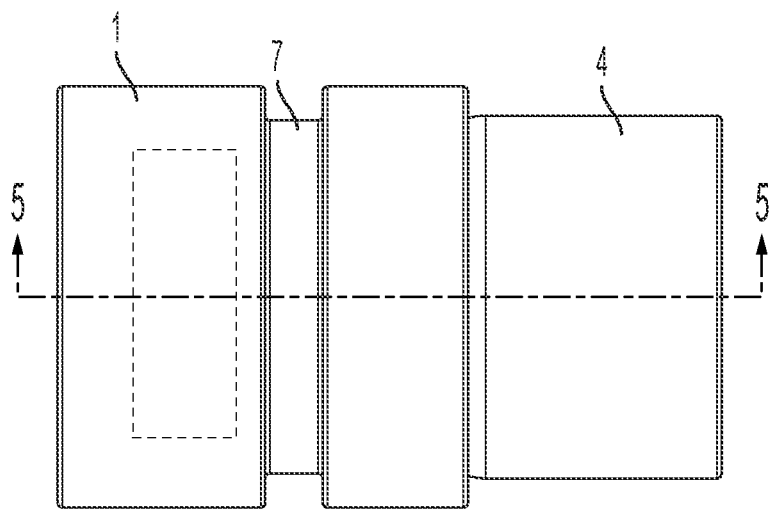
FIG. 2 is a side view of the relief valve shown in FIG. 1.

FIG. 2 is a side view of the relief valve shown in FIG. 1. FIG. 2 shows seat 1 and carrier 4 in their coupled arrangement. FIG. 2 also shows preferred o-ring groove 7, which as its name implies can be mated with an elastomeric (or other) o-ring to provide fit and sealing when the assembly is installed in a flow cage depicted in more detail below in connection with FIGS. 9-14, 17-22, and 26-27.

Figure 3:
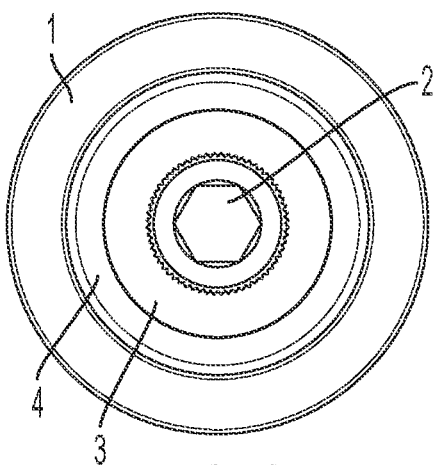
FIG. 3 is a bottom view of the relief valve shown in FIG. 1.

FIG. 3 is a bottom view of the relief valve shown in FIG. 1. As such, and as shown in FIG. 3, the bottom surfaces of seat 1, carrier 4, seal 3, and screw 2 are visible.

Figure 4:
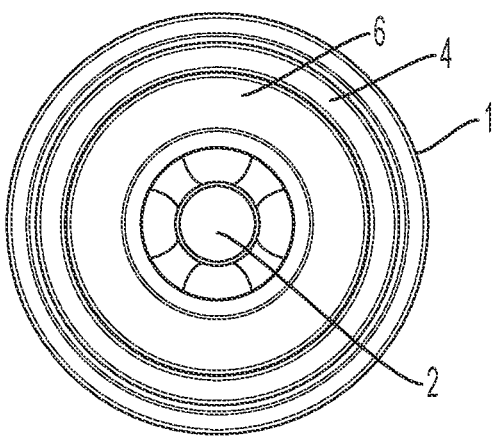
FIG. 4 is a top view of the relief valve shown in FIG. 1.

FIG. 4 is a top view of the relief valve shown in FIG. 1. As such, and as shown in FIG. 4, the top surfaces of seat 1, carrier 4, ported tube 6, and screw 2 are visible.

Figure 5:
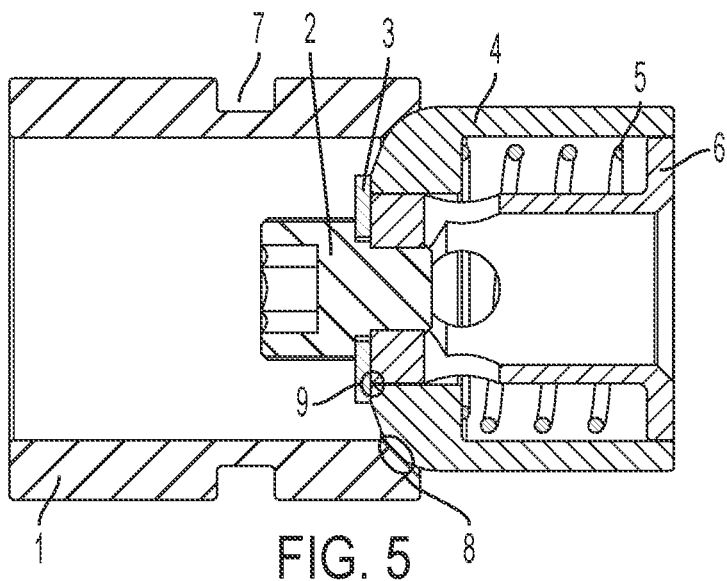
FIG. 5 is a cross-sectional view of the relief valve shown in FIG. 1 taken along cross-section line 5-5 in FIG. 2.

FIG. 5 is a cross-sectional view of the relief valve shown in FIG. 1 taken along the section line 5-5 in FIG. 2. FIG. 5 shows seat 1, screw 2, seal 3, carrier 4, spring 5, ported tube 6, and o-ring grove 7. The assembly of FIG. 5 is configured to operate as follows.

When the well is open and fluids/gas flow from left to right in FIG. 5 (as would naturally occur in a producing well), the assembly of screw 2, seal 3, carrier 4, spring 5, and ported tube 6 rise/separate from seat 1 (assuming the well pressure is sufficient to lift the assembly from seat 1), thereby allowing gas and fluids to flow through interface 8 between carrier 4 and seat 1. In other words, as carrier 4 separates from seat 1, gas and fluids are able to flow through the (now open) interface 8, thereby allowing the well to "flow". If the well is shut in or otherwise does not possess enough pressure to lift carrier 4 from seat 1, the well will not flow since there is no interface through which gas or fluids can travel from the bottom to the top of the well. It should be noted, as those skilled in the art will appreciate, that there could be cases in which fluid build-up (or even pressure artificially induced at the wellhead) above the assembly could be of such amount/degree that the pressure above the assembly is greater than the pressure below it, in which case the well also will not "flow" since there would be no opening at interface 8 through which gas or fluids can travel from the bottom to the top of the well.

Still further, however, the traveling relief valve of the present invention is configured and intended also to operate when the pressure above it is sufficiently greater than the pressure below it. For example, if the pressure above the assembly is sufficiently greater than the pressure below it (i.e., the pressure exerted on the facing surfaces of ported tube 6 is greater than the sum of the pressure below the assembly, plus the force exerted on ported tube 6 by spring 5) then the assembly of screw 2, seal 3, spring 5, and ported tube 6 will move downward against the force of spring 5, thereby opening interface 9 between seal 3 and carrier 4. When the pressure is as such, any liquids or gases above the assembly will pass (from right to left (or from the top of the well toward the bottom of the well)) through the now open interface 9. As those skilled in the art will appreciate, such circumstances can occur in any number of circumstances, including when fluid build-up above the assembly is sufficient to create the requisite pressure differential and/or when a well operator artificially increases the wellhead pressure for chemical treating or other such purposes.

Selecting springs 5 of different compression coefficients can vary the amount of pressure necessary to open interface 9. Exemplary, and preferred in the case of the present assignee, compression coefficients can be equivalent to ¼ or ½ barrel. One advantage of the present design is as stated above, i.e., it allows a well operator to artificially increase the wellhead pressure so as to "open" the valve (i.e., open interface 9), thereby enabling the operator to treat the well in well-known respects not possible with a traditional ball valve. Likewise, in instances in which the well is temporarily shut in, the fluid load above the assembly can be advantageously controlled over that which could be accomplished with a traditional ball valve, since a load that is sufficiently large will force open interface 9 and "bleed" the load down until it is small enough that interface 9 closes. When the well is re-opened the remaining load does not have to be re-accumulated in the well-bore and is already available to be more quickly removed with a plunger, pump, or otherwise.

Figure 6:
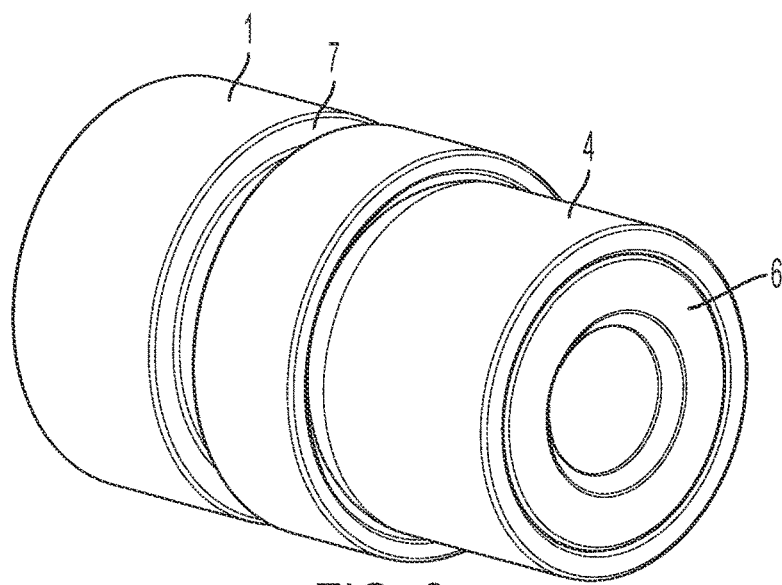
FIG. 6 is a perspective view of the relief valve shown in FIG. 1 wherein the ported tube is not compressed within the carrier of the relief valve.
Figure 7:
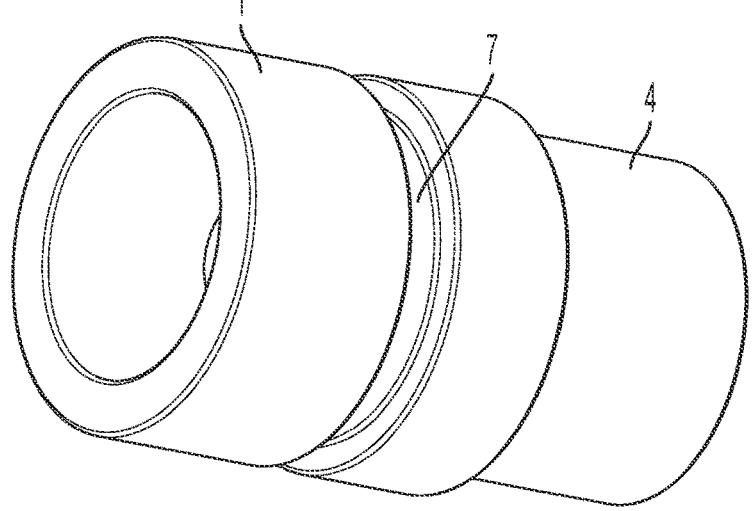
FIG. 7 is a perspective view of the relief valve shown in FIG. 1.
Figure 8:
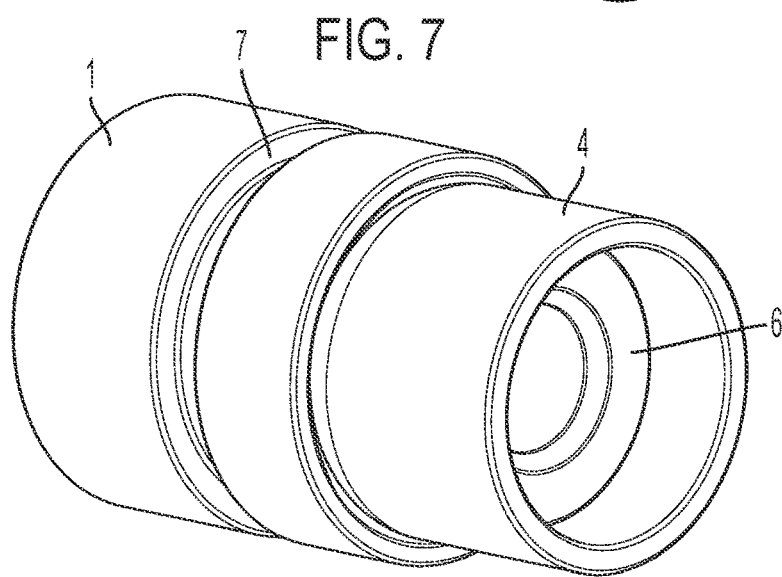
FIG. 8 is a perspective view of the relief valve shown in FIG. 1 wherein the ported tube is compressed within the carrier of the relief valve.

FIG. 6 is a perspective view of the relief valve shown in FIG. 1 wherein ported tube 6 is not compressed within carrier 4 of the relief valve. FIG. 7 is another perspective view of the relief valve shown in FIG. 1. FIG. 8 is a perspective view of the relief valve shown in FIG. 1 wherein ported tube 6 is compressed within carrier 4 of the relief valve. In other words, given the compression status of ported tube 6, interface 9 will be "closed" in FIG. 6 and "open" in FIG. 8.

Figure 9:
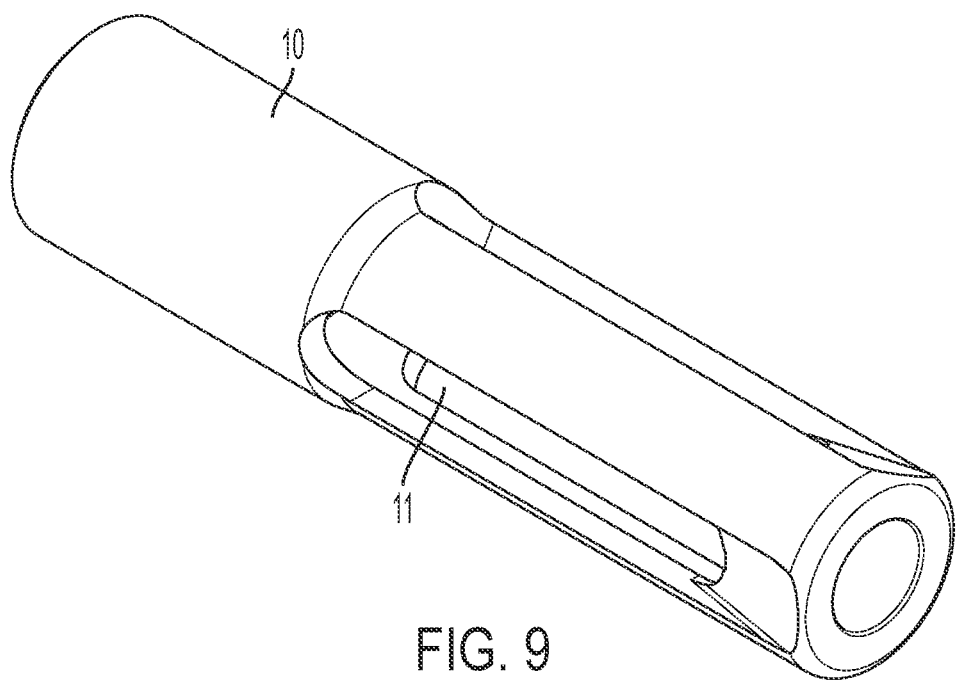
FIG. 9 is a perspective view of a flow cage, commonly associated with a bottom hole spring assembly.
Figure 10:
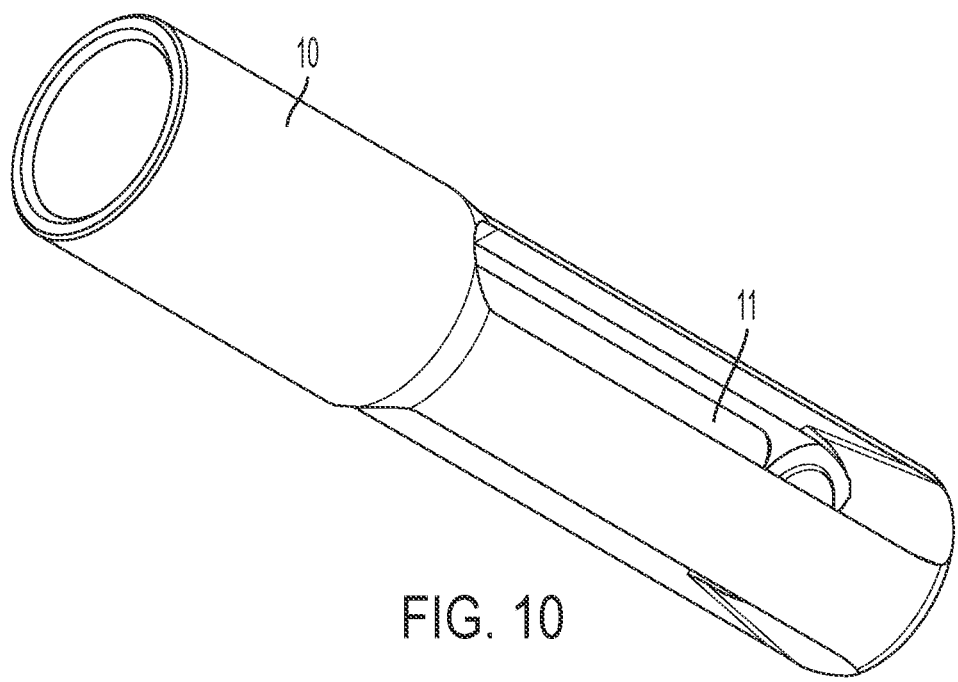
FIG. 10 is a another perspective view the flow cage of FIG. 9.
Figures 11, 12, 13, 14:
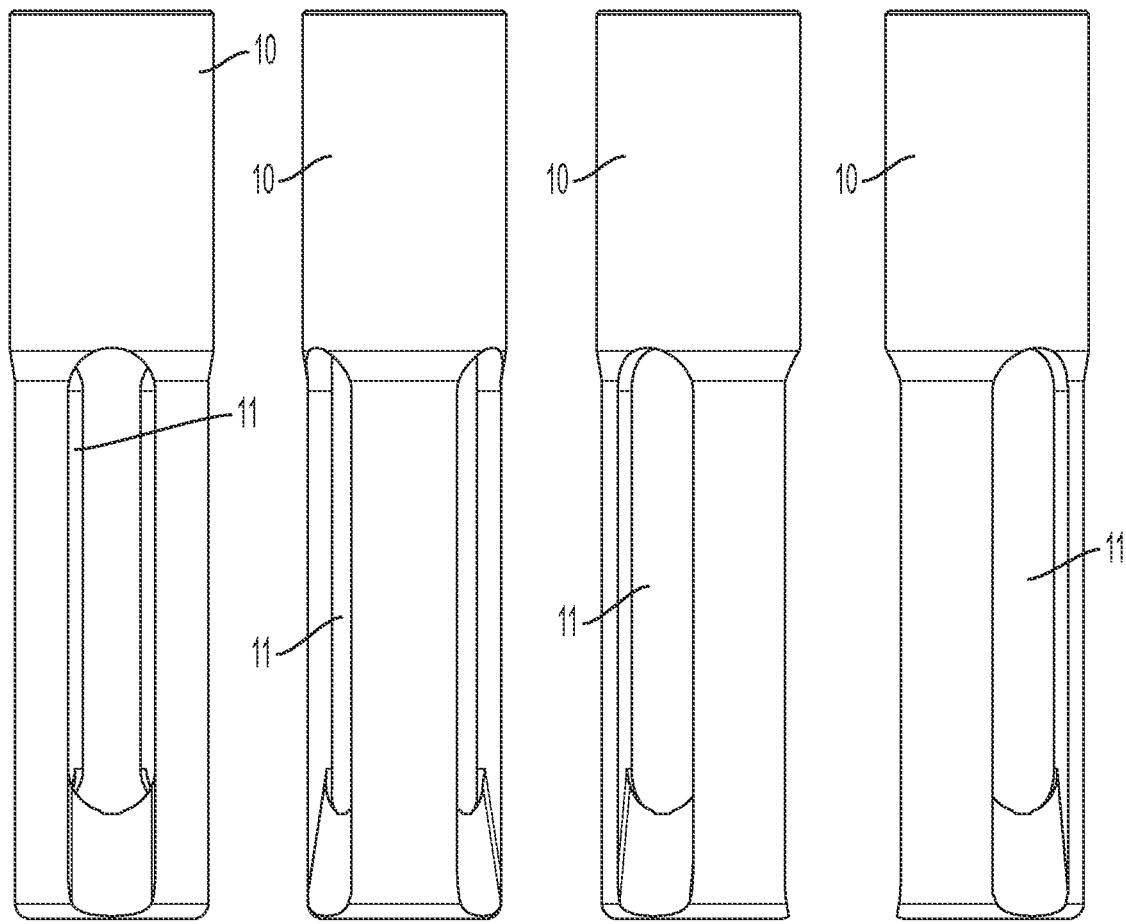
FIG. 11 is a front view of the flow cage of FIG. 9.
FIG. 12 is a back view of the flow cage of FIG. 9.
FIG. 13 is a side view of the flow cage of FIG. 9.
FIG. 14 is a side view of the flow cage of FIG. 9.
Figures 15, 16:
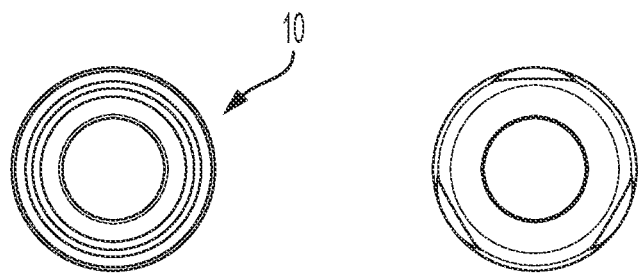
FIG. 15 is a bottom view of the flow cage of FIG. 9.
FIG. 16 is a top view of a the flow cage of FIG. 9.

FIGS. 9 and 10 are perspective views of flow cage 10, commonly associated with a bottom hole spring assembly. As described in more detail below in connection with FIG. 18 and FIGS. 25-27, the traveling valve assembly of FIGS. 1-8 can be mounted in a portion of flow cage 10. Flow cage 10 preferably includes a number of vents 11 though which well gases and fluids flow, typically entering flow cage 10 at end 12 and exiting flow cage 10 via vents 11 when the well is flowing naturally. Similarly, FIGS. 11-14 are a front view, a back view, a side view, and another side view of flow cage 10, respectively. FIG. 15 is a bottom view of flow cage 10 and FIG. 16 is a top view thereof.

Figure 17:
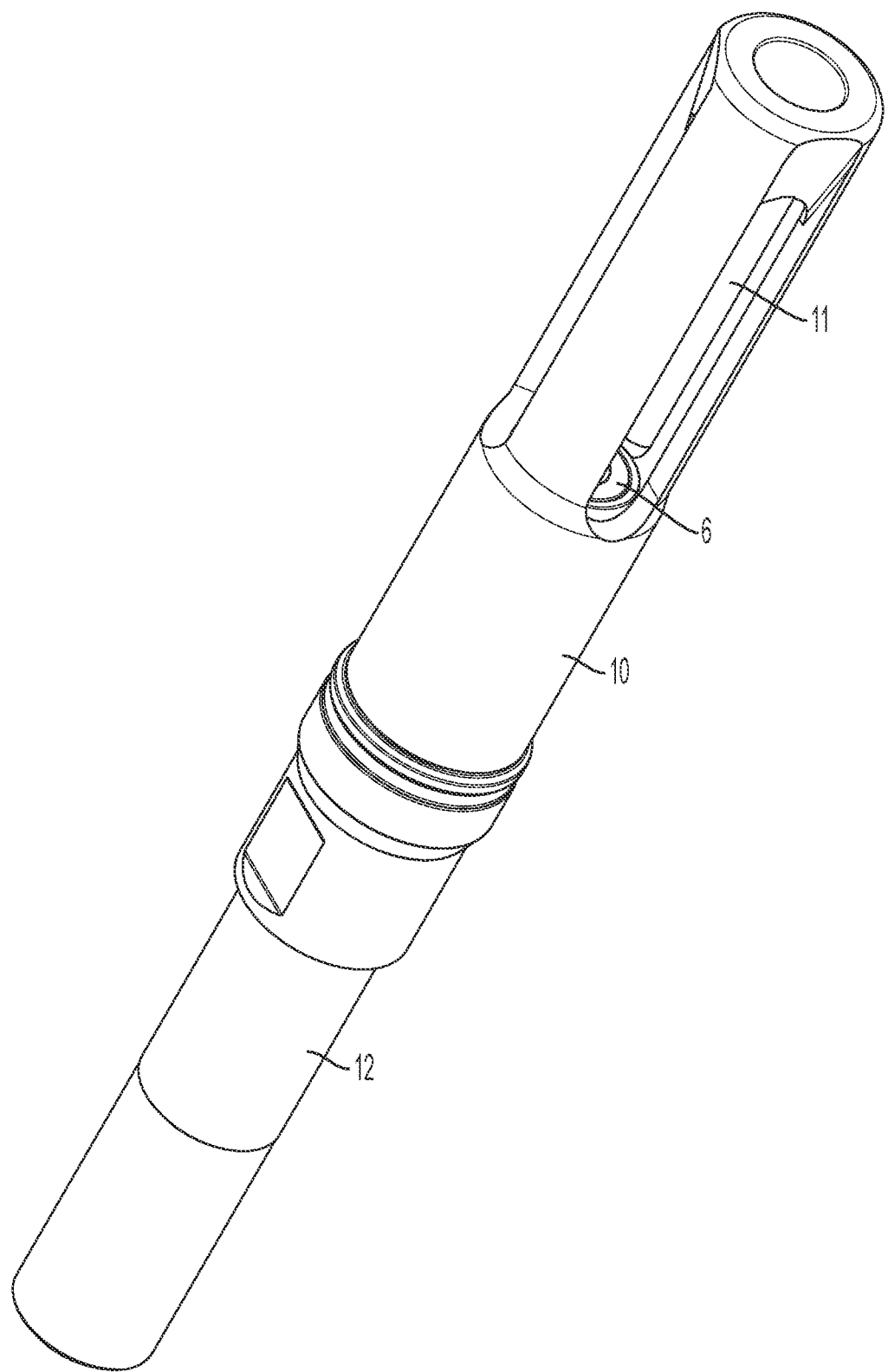
FIG. 17 is a perspective view of a flow cage coupled to a hold down accessory, including a traveling relief valve mounted therein.
Figure 18:
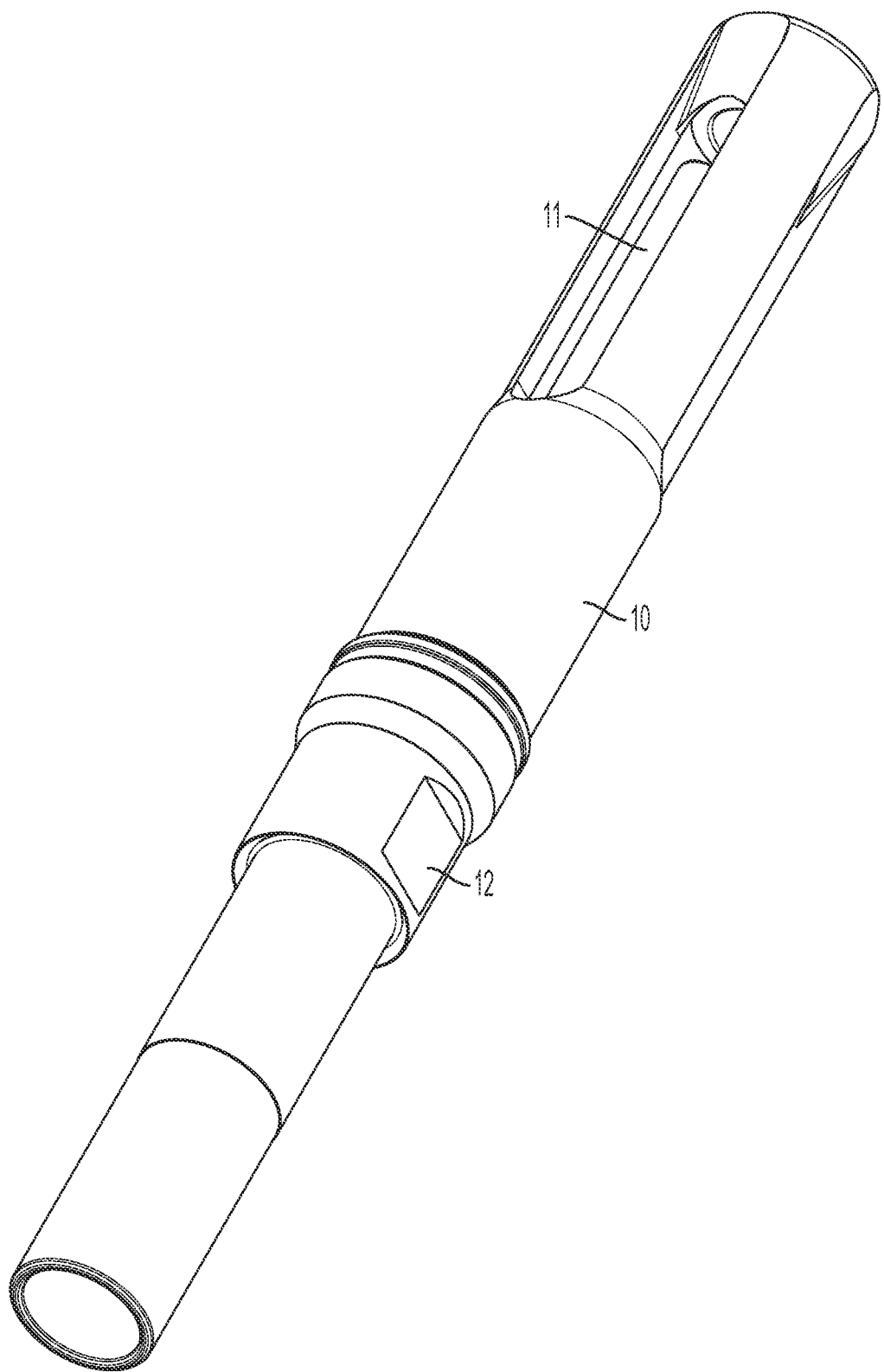
FIG. 18 is another perspective view of the flow cage coupled to a hold down accessory shown in FIG. 17.
Figure 23:
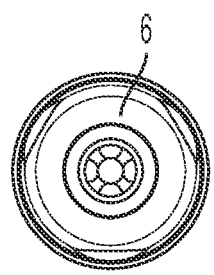
FIG. 23 is a top view of the flow cage coupled to a hold down accessory shown in FIG. 17.
Figure 24:
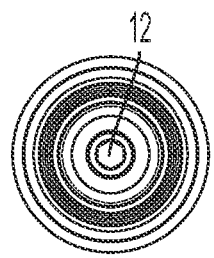
FIG. 24 is a bottom view of the flow cage coupled to a hold down accessory shown in FIG. 17.

FIGS. 17-24 are various views of flow cage 10 coupled to hold down accessory 12. Hold down accessory 12 operates to hold or anchor flow cage 10 at or near the bottom of the well. Specifically, FIG. 17 is a perspective view of hold down accessory 12 shown coupled to flow cage 10. The coupling can be accomplished by known mechanisms, such as a threaded connection. As will be further described in connection with FIGS. 25-27, FIG. 17 shows the top surface of ported tube 6, thereby illustrating that the remainder of the traveling valve assembly (as shown in FIGS. 1-8) is mounted in flow cage 10. FIG. 18 is another perspective view of the combination of hold down assembly 12 coupled to flow cage 10. FIGS. 19-22 are a front view, a back view, a side view, and another side view of the combination of flow cage 10 and hold down assembly 12, respectively. FIG. 23 is a top view of the combination of hold down assembly 12 coupled to flow cage 10, whereas FIG. 24 is a bottom view thereof.

Figure 19:
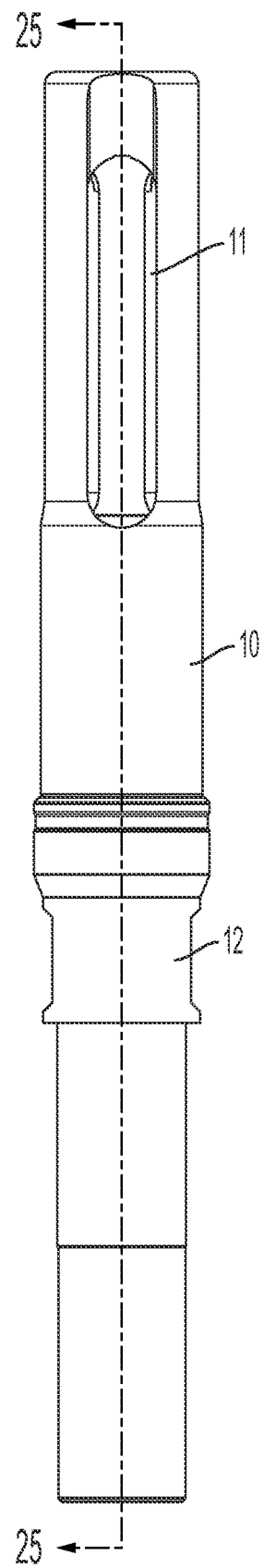
FIG. 19 is a front view of the flow cage coupled to a hold down accessory shown in FIG. 17.
Figure 20:
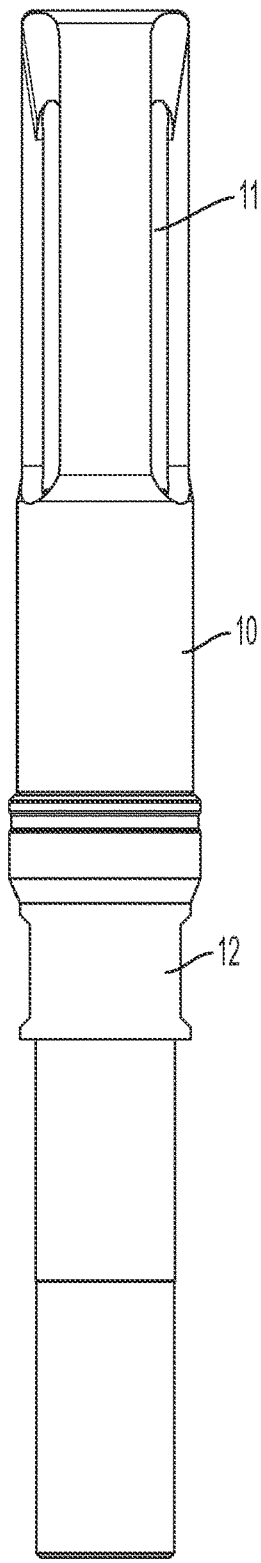
FIG. 20 is a back view of the flow cage coupled to a hold down accessory shown in FIG. 17.
Figure 21:
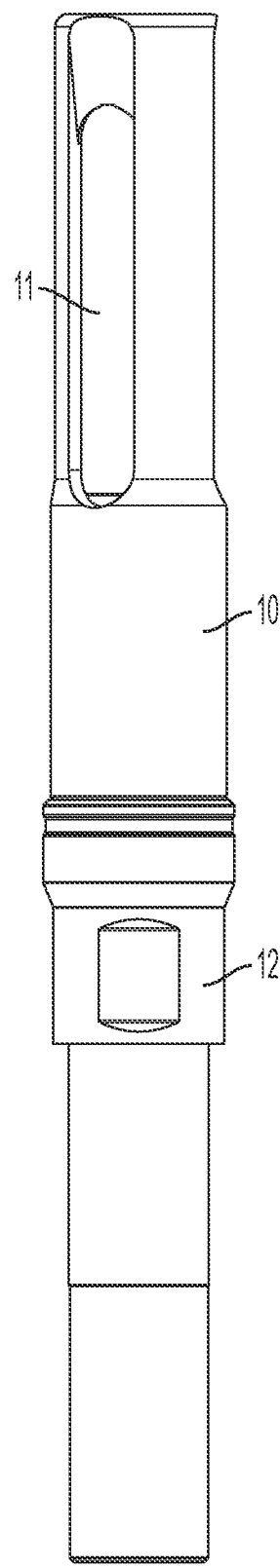
FIG. 21 is a side view of the flow cage coupled to a hold down accessory shown in FIG. 17.
Figure 22:
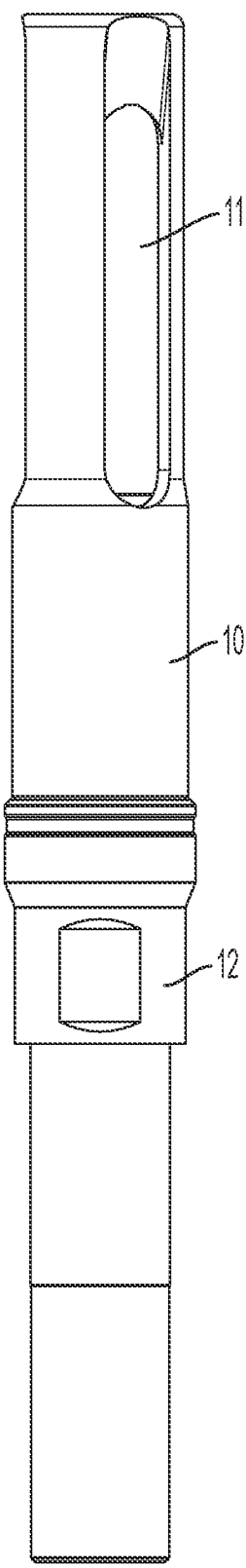
FIG. 22 is a side view of the flow cage coupled to a hold down accessory shown in FIG. 17.
Figure 25:
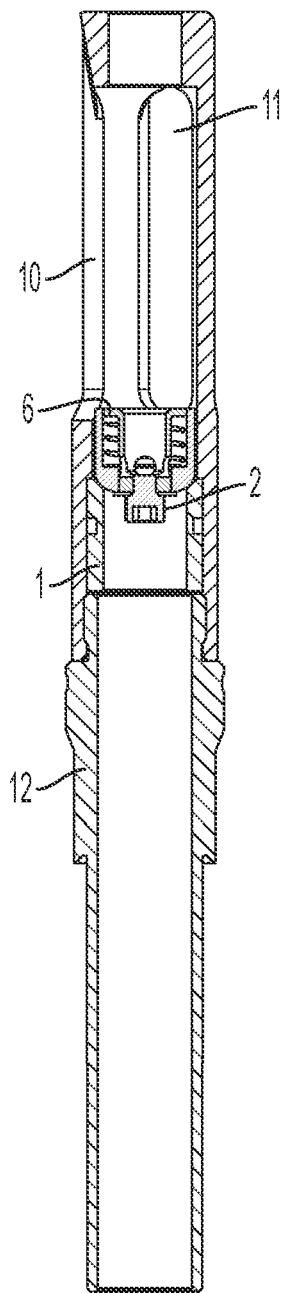
FIG. 25 is a cross-sectional view taken along the cross-sectional line 25-25 shown in FIG. 19, wherein the traveling relief valve is in a first position and its ported tube is not compressed within its carrier.
Figure 26:
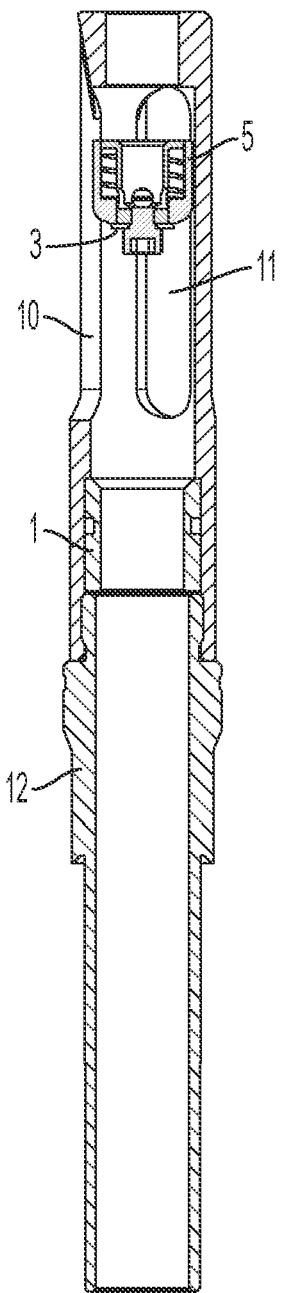
FIG. 26 is a cross-sectional view taken along the cross-sectional line 25-25 shown in FIG. 19, wherein the traveling relief valve is in a second position.
Figure 27:
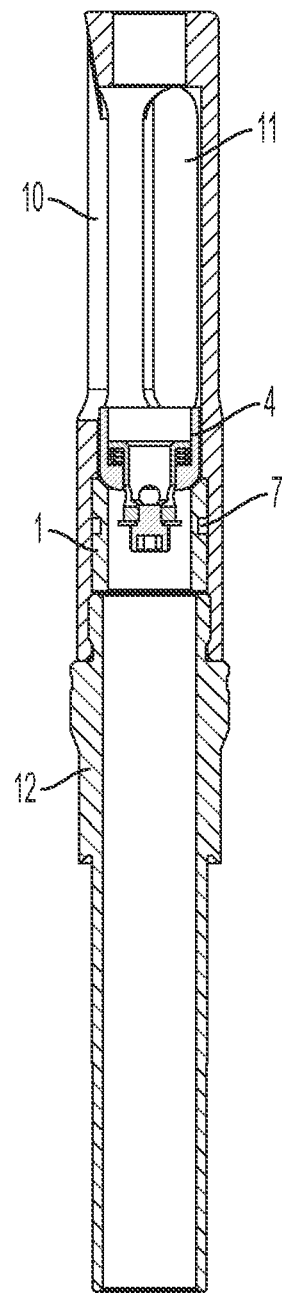
FIG. 27 is a cross-sectional view taken along the cross-sectional line 25-25 shown in FIG. 19, wherein the traveling relief valve is in a first position and its ported tube is compressed within its carrier.

FIGS. 25-27 are cross sections of the combination of hold down assembly 12 coupled to flow cage 10 taken along the section line 25-25 in FIG. 19. With these cross sections, the traveling relief valve of the foregoing Figures can be seen mounted in flow cage 10. Still further, FIGS. 25-27 illustrate several of the pressure differential scenarios that affect the operation of the traveling relief valve.

Specifically, FIG. 25 shows a scenario in which the pressure below the relief valve is not sufficient to lift carrier 4 from its resting interface with seat 1 (see FIG. 26). Likewise, the pressure above the relief valve is not sufficient to compress ported tube 6 within carrier 4 against the pressure exerted by spring 5 (see FIG. 27). Thus, in the pressure equilibrium state shown in FIG. 25, the well will neither flow from bottom to top (i.e., interface 8 is closed), nor will the well flow from top to bottom (i.e., interface 9 is closed).

FIG. 26 shows a scenario in which the pressure below the relief valve is sufficient to lift carrier 4 from its resting interface with seat 1. In this scenario, the combination of carrier 4, screw 2, seal 3, spring 5, and ported tube 6 rise in flow cage 10, thereby opening interface 8 and allowing the well to flow from bottom to top through vents 11. As shown, seat 1 stays in its substantially fixed position in flow cage 10.

FIG. 27 shows a scenario in which the pressure above the relief valve is sufficient to compress ported tube 6 within carrier 4, thereby opening interface 9 and allowing the well to flow from top to bottom. As shown, seat 1 stays in its substantially fixed position in flow cage 10.

As indicated above, it should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art will understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A traveling relief valve assembly for reducing fluid build-up at the bottom of a gas well, comprising:
   a hold down accessory mounted in the gas well, wherein the hold down accessory includes a bore through which fluids in the gas well flow;
   a flow cage having an upper end and a lower end, wherein the flow cage is connected to the hold down accessory and wherein the flow cage includes a bore having a plurality of vents through which fluids in the gas well flow, and wherein the bore of the flow cage and the bore of the hold down accessory are fluidly connected;
   a traveling relief valve disposed in the bore of the flow cage to travel between the upper end and lower end of the flow cage;
   a seat securely mounted in the bore of the flow cage, wherein the seat includes a bore in fluid communication with the bore of the hold down assembly and through which fluids from the gas well flow, wherein the seat further includes a top end and a bottom end;
   the traveling relief valve including a carrier having a top end and a bottom end, whereby the carrier is movably positioned in relation to the seat to form a first open or closed interface between the top end of the seat and the bottom end of the carrier, whereby the first interface is open when pressure in the gas well below the carrier is greater than above the carrier, and whereby the first interface is closed when pressure in the gas well above the carrier is greater than below the carrier, such that changes in said pressures within the gas well cause the first interface to open or close;
   whereby the first open interface between the carrier and the seat includes the carrier being positioned in the bore of the flow cage above the seat such that no portion of the carrier is positioned within the bore of the seat; and
   a ported tube movably secured within the carrier to form a second open or closed interface for flow through the ported tube, whereby the second interface is closed when pressure in the well below the ported tube is greater than above the ported tube, and whereby the second interface is open when pressure in the well above the ported tube is greater than below the ported tube, such that changes in said pressures within the well cause the second interface to open or close,
   whereby the traveling relief valve assembly includes a flow path through which the gas well fluids flow to reduce fluid build-up at the bottom of the well when the second interface is open, said flow path including the bore of the flow cage, the ported tube, the second interface, the bore of the seat, and the bore of the hold down assembly.

2. The traveling relief valve of claim 1 wherein the first interface is closed when the second interface is open.

3. The traveling relief valve of claim 2 wherein the first interface is open when the second interface is closed.

4. The traveling relief valve of claim 3 wherein the carrier includes a spring and said spring affects the amount of pressure required to open or close the second interface.

5. The traveling relief valve of claim 4 wherein the spring is a compression spring having at least a first compression point corresponding to a first position of the ported tube within the carrier and a second compression point corresponding to a second position of the ported tube within the carrier.

6. The traveling relief valve of claim 5 wherein the spring is compressed more at the second compression point than at the first compression point and wherein the second interface is open when the spring is at its second compression point.

7. The traveling relief valve of claim 6 wherein the ported tube is secured within the carrier by a screw.

8. The traveling relief valve of claim 7 further including a seal between the screw and the bottom end of the carrier.

9. The traveling relief valve of claim 8 wherein the seat includes an o-ring groove.

10. The traveling relief valve of claim 9 wherein the o-ring groove includes an o-ring.

11. The traveling relief valve of claim 1 wherein the ported tube is movably secured within the carrier to move between at least a first position within the carrier and a second position within the carrier, wherein the second interface is closed when the ported tube is in its first position and the second interface is open when the ported tube is in its second position.

12. The traveling relief valve of claim 11 wherein flow in the gas well travels from above the traveling relief valve to below the traveling relief valve when the ported tube is in its second position.

13. The traveling relief valve of claim 5 wherein the second interface is closed when the ported tube is in its first position within the carrier, and wherein the second interface is open when the ported tube is in its second position within the carrier.

14. The traveling relief valve of claim 8 including an interface between the seal and the bottom end of the carrier, whereby said interface includes the second interface.

\* \* \* \* \*